Figure 1:
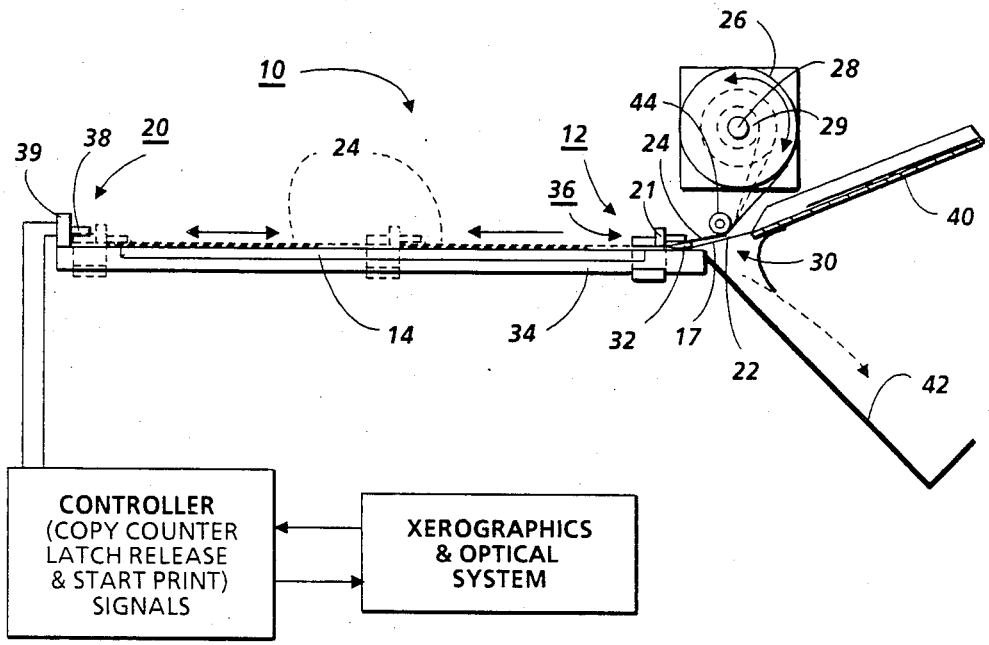

United States Patent [19]

Rauen et al.

[11] Patent Number: 4,721,981
[45] Date of Patent: Jan. 26, 1988

[54] LOW-COST DOCUMENT FEEDER FOR COPIERS

[75] Inventors: David F. Rauen, Ontario; Donald W. Tates, Fairport, both of N.Y.

[73] Assignee: Xerox Corporation, Stamford, Conn.

[21] Appl. No.: 926,305

[22] Filed: Nov. 3, 1986

[51] Int. Cl.$^4$ .............................................. G03B 27/62
[52] U.S. Cl. ..................................... 355/75; 271/244; 271/268; 355/3 R
[58] Field of Search ............... 355/3 R, 3 SH, 14 SH, 355/50, 75; 271/244, 245, 268

[56] References Cited

U.S. PATENT DOCUMENTS

| | | | |
|---|---|---|---|
| 3,560,090 | 2/1971 | Jones | 355/82 |
| 3,663,010 | 5/1972 | Frederick et al. | 271/268 X |
| 3,726,589 | 4/1973 | Difulvio et al. | 355/64 |
| 3,797,823 | 3/1974 | Clark | 271/268 X |
| 3,809,474 | 5/1974 | Mihalik | 355/75 X |
| 3,888,582 | 6/1975 | Griswold | 355/69 |
| 3,907,277 | 9/1975 | Robertson | 271/84 |
| 3,915,447 | 10/1975 | Derno | 271/7 |
| 3,944,366 | 3/1976 | Robertson | 355/76 |
| 4,031,824 | 6/1977 | Bubley et al. | 271/268 X |
| 4,185,815 | 1/1980 | Abbott et al. | 271/225 |
| 4,190,359 | 2/1980 | Murayama et al. | 355/75 |
| 4,512,658 | 4/1985 | Winkelmann | 355/75 X |

FOREIGN PATENT DOCUMENTS 56-127286 8/1981 Japan.
57-45570 3/1982 Japan.

OTHER PUBLICATIONS

"Transport for Automatic Book Copying", by Frank Yang; Xerox Disclosure Journal; vol. 10, #2, Mar.-/Apr. 1985.

Primary Examiner—Fred L. Braun

[57] ABSTRACT

Document sheet handling apparatus for a copier for sequentially feeding document sheets on to and off of the copying platen with a document feeder frictionally engaging a document sheet inserted at a first side of the platen and transporting a document sheet over the platen by continued engagement, and a flexible platen cover integrally connecting to the document feeder for movement therewith over the platen, and a reel system, including a retracting spring for reeling up the flexible platen cover into a scroll adjacent the first side of the platen and above the document sheet input, so that a document sheet may be fed under the scroll, the flexible platen cover being unreeled to extend over the platen by the movement of the integral document feeder to overly the platen and provide an opaque and light reflective platen cover, and a releasable latch adjacent the opposite side of the platen for latching the document feeder and the flexible platen cover over the platen in a position for copying the document, and an automatic release for unlatching the releasable latch in response to the completion of the selected number of copies of the document, so that the document feeder and document are automatically returned to the first side of the platen, moved theretowards by the retracting spring while being overlaid by the flexible platen cover, to eject the document automatically from the same first side.

10 Claims, 2 Drawing Figures

LOW-COST DOCUMENT FEEDER FOR COPIERS

This invention relates to an improved document sheet handler for a copier, and in particular, to a low-cost and compact integral document sheet feeder and platen cover, integrally movable to feed a document sheet on to and off of the copying platen of the copier.

The art of original document sheet handling for copiers has been intensively pursued in recent years. Various systems have been provided for automatic or semi-automatic feeding of document sheets to be copied to and over the imaging station of the copier. The documents are normally fed over the surface of a transparent platen into a registered copying position on the platen, and then off the platen. Such automatic or semiautomatic document handlers eliminate the need for the operator to place and align each document on the platen by hand. This is a highly desirable feature for copiers. Document handlers also enable the full utilization or productivity of higher speed copiers, which cannot reliably be fed documents manually as fast as they can be copied. Lower cost, more compact, and lighter weight document handlers are particularly desired. This is especially true in the normal arrangement in which the document feeder is a part of and/or provides a repositionable platen cover overlying the copier platen.

Various of the difficulties and problems in original document sheet handling are discussed in further detail in the references cited herein. These problems are much greater than the copy sheet feeding in many respects. Even related sets of original document sheets may vary considerably in weight, stiffness, size, material, age, friction, fuser oil or other surface coatings, folds, curls, tears, smearable typing or printing, or other conditions. They may even have sprocket or binder holes. Document handlers must reliably overcome various, and often conflicting, requirements for reliable and timely document feeding and registration, with minimal document wear or platen glass wear, and without damage to valuable originals. The document normally must be initially transported quickly without substantial skew or slippage, then rapidly stopped in a desired or defined imaging position, usually with at least one edge of the document aligned with at least one edge of the platen, and then quickly reaccelerated after copying to eject the document from the platen into a restacking tray.

Even for smaller, lower cost, and slower copiers, it has become increasingly desirable to provide mechanized or automated handling of documents. The documents may be automatically separated and sequentially fed from a stack of documents, or fed semiautomatically by an operator "stream feeding" individual documents into an input area of the document handler. In either case the document handler desirably does the final feeding and registration of individual documents into and through the copying position, and then ejects the documents from the platen automatically. However, for compact and low cost copiers, an appropriate document handler should also be simple, very low cost, lightweight and compact.

A document handling system preferably utilizes the existing or generally conventional copier optical imaging system of the copier on which it is mounted, including the external transparent copying window (known as the platen) of the copier. It is also desirable that a document handling system be readily removable, to allow the operator to manually place selected documents, such as books, on the same platen. A low mass document handler makes this movement easier and safer.

A document handling system should also provide a suitable white (uniform light reflecting) imaging background surface. This is usually provided by a platen cover member overlying the platen under which documents can be copied without serious "show-through" or "show-around" copy defects (undesirable images from the document handler printing out on the copy sheets). A document handling system should also substantially flatten the document against the platen and thus maintain the document in focus and provide uniform and undistorted copying.

The appropriate type of document transport and registration system is affected by the type of copier optics. In either a scanning (moving) optics system, or a full frame or flash imaging system, the platen is stationary, and the entire area to be copied must overly the platen during copying and the document must be held stationary against the platen during copying.

In contrast, in a moving platen system the document is copied while the document and platen are being moved as a unit. In a moving platen copier the document is held in a full size flat glass platen unit, usually under a cover, forming a protective "sandwich", and that rigid, and much higher mass, platen unit must be transported at a constant velocity relative to the imaging station (over a copying window) for proper imaging. The document moves past a stationary optics (including illumination) system at a constant speed synchronized to the photoreceptor imaging surface speed. In a moving platen copier the entire platen unit must then reverse in a higher speed return or "flyback" movement before the next copying movement. One example of a platen drive system for a moving platen copier is illustrated in U.S. Pat. No. 4,190,349 issued Feb. 26, 1980 to Y. Ohno, et al. A moving platen system allows for a low cost copier imaging system, but has interfered with automatic document feeding and registration placement. It has generally been necessary in a moving platen system to manually preregister the document on the platen before starting the copying.

It is also important to distinguish a CVT system. In a CVT system the document sheet is moved by transport wheels or belts at a constant velocity over a stationary but narrow transparent scanning window or platen of the copier. CVT systems can have particular problems in maintaining a sufficiently accurate constant speed of the document with variations in document thickness, variations in deformable document feed roller diameters, or variations in frictional resistance to feeding between the document, the document feed rollers, and the platen glass. In a CVT document feeder the document sheet, regardless of its above-noted variations, must be forced to slide without lifting across a small stationary glass platen or slit at a constant velocity throughout the entire imaging of the document in order to provide proper imaging. CVT systems can also have problems with wear or scratching of the platen glass from the documents or the feed rollers. Importantly, a CVT system does not allow alternative fully manual handling of the document, which is particularly desirable for valuable or delicate documents. CVT and other fixed platen document feeders can also have generated static electricity platen attraction and other document feeding problems.

The present invention is not limited to a particular or specific type of document illumination or optics system. However, it is particularly suitable for providing a simple, low cost, compact and light weight document transport for a low-cost fixed platen type copier.

Of particular interest to the present invention by way of background, first as to flexible or scrolled platen covers, U.S. Pat. No. 3,560,090 issued Feb. 2, 1971 to B. L. Jones discloses a platen cover employing a pair of curtains which are drawn in succession from rolls over the platen. However, note particularly the distinctions in, for example, Col. 5, lines 3–24, etc.. Also, U.S. Pat. No. 3,726,589 issued Apr. 10, 1973 to A.P. Difulvio et al discloses an auxiliary light shield retractable by a spring-loaded storage spool. However, as indicated, it is for use when the document feeder is moved to its nonuse position. That is, as also appears to be the case with the preceding Jones U.S. Pat. No. 3,560,090, this is merely a system for overlying with a flexible platen cover a document previously manually placed on the platen, and without moving that document. That is, these flexible platen covers must be separately placed over the platen after the document has been manually placed on the platen, and then separately removed from the platen to one side of the platen before the document is removed, and the former must somehow be done (presumably by maintaining a spacing out of contact) such that the previous manual registration position of the document is not disturbed. Also, the spacing of these covers from the platen does not appear suitably controlled to provide a properly spaced light reflective surface or sufficient flattening or hold-down of document sheets.

Of particular interest is U.S. Pat. No. 4,185,815 issued Jan. 29, 1980 to P. E. Abbott et al (IBM) in which a carriage is movably mounted above the platen and reciprocated for feeding, and two belts extend between the sheet feed frame at opposite ends of the movable carriage so that when the carriage is reciprocated the belts transport the sheets to register it, i.e., "roll on" to hold it down in the processing station, and then remove it. However, as may be seen, this is a much more complicated and less compact system than that disclosed herein.

Book copying by a book lying on top of a moving retractable (scrollable) web is disclosed, for example, in Xerox Disclosure Journal, Vol. 10, No. 2, March/April 1985, pp. 63–64.

Also of particular interest is a Japanese Utility Model Laid-open No. 58-34128, laid open Mar. 5, 1983 from Application No. 56-127286 of Aug. 27, 1981 by Konishiroku Photo Co., Ltd.. It appears to disclose a conveyor belt which moves with the original document onto the exposure surface under another, fixed, platen cover during the feeding of the original document, and then removes the document by the return of the conveyor belt.

U.S. Pat. Nos. 3,907,277 issued Sept. 23, 1975, and 3,944,366 issued Mar. 16, 1976, both to D. A. Robertson, disclose a sliding platen cover apparatus in which the movement of the platen cover after copying is utilized to remove a document previously placed on the platen.

U.S. Pat. No. 3,888,582 issued June 10, 1975 to A. W. Griswold, and its Reexamination B1 3,888,582 issued Sept. 7, 1982 as Reexamination No. 62, and the art cited therein, is of particular interest for a magnetic platen cover latch which can be either manually unlatched or automatically unlatched electrically after the completion of the desired number of copies of a document. It, or a modification thereof, may be utilized for the automatic unlatching system of the present invention. It will be appreciated however, that it is used in a different manner and in a different relation to the document feeding. In this reference, the document is placed for copying on the platen manually, and then is ejected by a motor-driven feed roller which ejects the document before the platen cover is released, and the platen cover then pivotably lifts away from the platen.

Japanese Laid-open No. 57-45570, laid open Mar. 15, 1982 from Application No. 55-121026 filed Sept. 3, 1980 by Satoshi Kanda (Ricoh) apparently discloses a platen cover which curls up by its own curling characteristic away from the original upon the release of a magnetic latch therefor.

With reference to low-cost document ejectors for copiers, it is known to do this for a fixed platen copier with a small electrical motor. It is also known from U.S. Pat. No. 4,190,359 issued Feb. 26, 1980 to Y. Murayama et al (FX/1880) to store spring energy from the movement of the platen cover and release it for document ejection. For copiers of the moving platen type, various references teach winding up a spring motor system with a scanning movement of the platen for subsequent document ejection with a document ejection roller.

The feeding of a document sheet with an elastomer pad, bump or the like, frictionally engaging and moving the document sheet across the platen is known for motor-driven endless belts. Various of this art is collected in the file of pending U.S. Ser. No. 882,120 filed July 3, 1986 by Denis J. Stemmle, and commonly assigned. A gripping or folding feeding pad is disclosed in U.S. Pat. No. 3,915,447 issued Oct. 28, 1975 to B. J. Perno. Examples of frictional bumps molded into an endless document belt are in the Fuji Xerox "4800" and Xerox "1055" semiautomatic document handlers. Noted in this regard are Fuji Xerox Japanese Applications Nos. 53-156084 filed Nov. 15, 1978 and 55-87904 filed June 23, 1980 (FX/2555 and FX/3462). The respective laid-open numbers are believed to be Utility Model Laid-open Nos. 55-073951 laid open May 21, 1980 and 57-11533 laid open Jan. 21, 1982. Copies are in the pending file of said Ser. No. 882,120. An elastomeric pad may be formed by localized protrusions of a wide belt of frictional material as in U.S. Pat. No. 3,910,570 issued to C. D. Bleau (IBM) (See FIG. 4 and Col. 4, lines 43 et al.)

U. S. Pat. No. 4,030,826 issued June 21, 1977 to A. G. Sangster discloses a means for exposing sensitized paper or film for a blueprint machine in which the original face of transparent or translucent original is held in contact with both the sensitized paper or film and a light permeable cylinder by means of a conforming flexible cover member. The apparatus has a manually controlled braking system, which normally prevents rotation of the cylinder, which is manually released by the operator to permit a spring biased return to draw the cover member about the cylinder.

U. S. Pat. Nos. 1,437,030 issued Nov. 28, 1922 and 4,031,824 issued June 28, 1977 respectively to E. T. Waters and H. J. Bubley et al are cited for edge grippers for copy sheets for printing presses.

The following Fuji Xerox applications relate to "roll-on" type document handlers: FX/1440, Japanese Application No. 51-072724, Application Date June 22, 1976 by Yoshihara Nanbe Laid-Open No. P52-156615, laid open on Dec. 27, 1977, issued Japanese Pat. No. 1081503; FX/2397 based on Application No. 53-123641, Application Date Sept. 11, 1978, Laid-open No. U55-41844, laid open on Mar. 18, 1980; FX/2771 based on Application No. 54-031756, Application Date Mar. 20, 1979, by Kazuyasu Sauga, Laid-open No. P55-124160, laid open on Sept. 25, 1980, Issued Japanese Pat. No. 1265727; FX/3313 based on Application No. 55-107777, Application Date Aug. 7, 1980 by Akira Mochizuki and Yasuki Shirai, Laid-open No. P57-34569, laid open on Feb. 24, 1982; FX/3119 based on Application No. 55-22198, Application Date Feb. 26, 1980, Laid-open No. P56-119144, laid open on Sept. 18, 1981; FX/3120 based on Application No. 55-22199, Application Date Feb. 26, 1980 both by Yoshiharu Nanba, Laid-Open No. P56-119145, laid open on Sept. 18, 1981.

Another original feeder with a conveying belt which is partially wound up is shown in Japanese Laid-Open No. 55-57863, laid open Apr. 30, 1980 based on Application No. 53-129729 filed Oct. 20, 1978 by Yoshio Itou (Canon).

In contrast to various of the above references, the novel document handler disclosed herein provides both a very simple and reliable document feeding, registration, and automatic document ejection. Yet it can be completely manual, i. e. not require any motors, drives or controls. Preferably, however, it includes an automatic releasing or unlatching system to allow multiple copies to be made of the same document before automatic ejection of the document sheet. With this disclosed system, the feeding of document sheets onto and off of the platen is both faster, less critical, and requires much less operator effort. It can enable the operator to speed up the document exchange time to the point where this can occur at the copying rate of many small copiers, thereby providing full copying productivity.

With the disclosed system, the document is well protected, and there is no relative movement between the platen cover and the document at any time. There is no forcing of the lead edge of the document against any registration edges or gates by the document feeding mechanism. The platen cover fully covers and surrounds the document to provide a uniform monolithic white imaging surface to prevent show-around or show-through copy defects. That is, no belt or feed wheel edge shadows or other images can print out on the copy sheets. The present system also handles, flattens, and provides protections for curled or delicate documents as compared to a document feeder in which the sheets are driven by belts, rollers or the like relative to obstructions or path restrictions for the document sheets.

An additional feature which is provided by the disclosed system is that the document sheets may be both fed onto the platen and ejected from the platen from the same side of the platen, i. e. from the same side of the copier. This allows for both the input and output trays for the original documents of the copier to be mounted on the same side of the copier, for both operator convenience and copier compactness.

The disclosed document handling system provides a very lightweight and compact document feeding system which is simple to manufacture and of low cost, and therefore highly suitable for those very low cost and/or very small copiers which typically heretofore had only manual document placement and removal. It may be readily seen that the document feeder disclosed herein, as compared to various of the references, is much more compact, simpler, and lighter.

The document handling system disclosed herein is particularly suitable for fixed platen copiers. Fixed platen copiers have significant advantages over moving platen copiers in terms of alternative book copying capability, optical uniformity, etc..

The present system may desirably either be a replacement for, or used in combination with, a conventional platen cover. That is, the present system, since it may be mounted to one side of the copier, may be provided in addition to a rigid or semirigid conventional platen cover pivotally hinged along the rear edge of the copier, which would simply be pivoted upwardly away from the platen to allow the operation of the disclosed system for document feeding in lieu of manual document placement.

It is a general feature of the document handling system disclosed herein to provide a document handling system which overcomes various of the above-discussed problems, and combines various desirable features in a very simple, economical and lightweight system providing reliable document feeding, registration, imaging, ejection and protection.

A feature of the specific embodiment disclosed herein is to provide an original document sheet handling apparatus for a copier for sequentially feeding document sheets on to and off of the copying platen of the copier, for making selected numbers of plural copies of document sheets, comprising:

document sheet input means adjacent a first side of said platen for inserting a document sheet into said document sheet handling apparatus, document sheet feeding means normally positioned adjacent said document sheet input means, said document sheet feeding means having frictional document engagement means for frictionally engaging a document sheet inserted in said document sheet input means, means for moving said document sheet feeding means over said platen to transport a document sheet over said platen therewith by continued engagement of the document sheet with said frictional document engagement means, flexible platen cover means integrally connecting adjacent one end thereof to said document sheet feeding means for movement therewith, reel means, including retracting spring means, for compactly reeling up said flexible platen cover means into a scroll adjacent said first side of said platen and above said document sheet input means, so that a document sheet may be fed under said scroll from said document sheet input means by said document sheet feeding means, said flexible platen cover means being unreeled from said reel means to extend over said platen by said movement of said integral document sheet feeding means over said platen, said flexible platen cover means being adapted to overly said platen and provide an opaque and light reflective platen cover when so unreeled, releasable latching means mounted adjacent an opposite side of said platen from said first side of said platen and said document sheet input means, said releasable latching means being adapted to engage and latch said document sheet feeding means and said flexible platen cover means with said flexible platen cover means being latched overlying said platen and the document sheet being transported by said document sheet feeding means with the document overlying the platen in a copying position, and release means for automatically releasing and unlatching said releasable latching means in response to the completion of the selected number of copies of the document sheet being copied, said document sheet feeding means and said flexible platen cover means being automatically returned to said first side of said platen by being moved theretowards by said retracting spring means of said reel means upon said automatic releasing of said releasable latching means by said release means, for automatically returning the document sheet therewith to said first side of said platen while still being overlaid by said flexible platen cover means, and document sheet output means including means for ejecting the document sheet from said first side of said platen with said automatic return of said document sheet feeding means.

Further features provided by the system disclosed herein, individually or in combination, include those wherein:

said document sheet input means comprises a document input tray, said document sheet output means comprises a document output tray, and said means for ejecting the document sheet from said platen with said automatic return of said document sheet feeding means comprises a document sheet path under said document input tray to said document output tray provided by mounting said document input tray slightly spaced above the level of said platen;

said means for moving said document sheet feeding means over said platen comprises guide track means adjacent said platen for controlling the movement path of said document sheet feeding means;

said frictional document engagement means comprises an elastomeric pad, and wherein when said document sheet feeding means is moved away from said document sheet input means said elastomeric pad automatically engages the document sheet; and wherein said document sheet feeding means is controlled by said guide track means to raise said elastomeric pad at a document input registration position at said document sheet input means to provide for both document engagement and initial document registration therewith, and wherein said document sheet feeding means is controlled by said guide track means to urge said elastomeric pad against said document towards said platen when said document sheet feeding means is being moved over said platen so as to transport a document sheet over said platen held between said elastomeric pad and said platen;

further including preregistration means integral with said platen cover means and said document sheet feeding means initially preregistering a document sheet at a preregistration position thereon and further including;

registration means integral with said flexible platen cover means and said documents sheet feeding means for initially preregistering the lead edge of a document sheet to said platen at a preregistration position thereon, and wherein said registration means comprises an adjacent integral document gate member extending transversely of the platen, downstream of said elastomeric pad to engage the lead edge of the document sheet after the document sheet has been fed under said elastomeric pad, and means for releasing the document sheet adjacent said document sheet output tray; and wherein said copier has a conventional slightly raised registration edge adjacent said opposite side of said platen and said frictional document engagement means is adapted to drive a document sheet into engagement with said registration edge just before said engagement of said latching means and then slip relative to the document sheet to provide final registration of the document sheet.

Some examples of various other prior art copiers with document handlers, and especially with control systems therefor, including document sheet detecting switches, etc., are disclosed in U.S. Pat. Nos. 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

Figure 2:
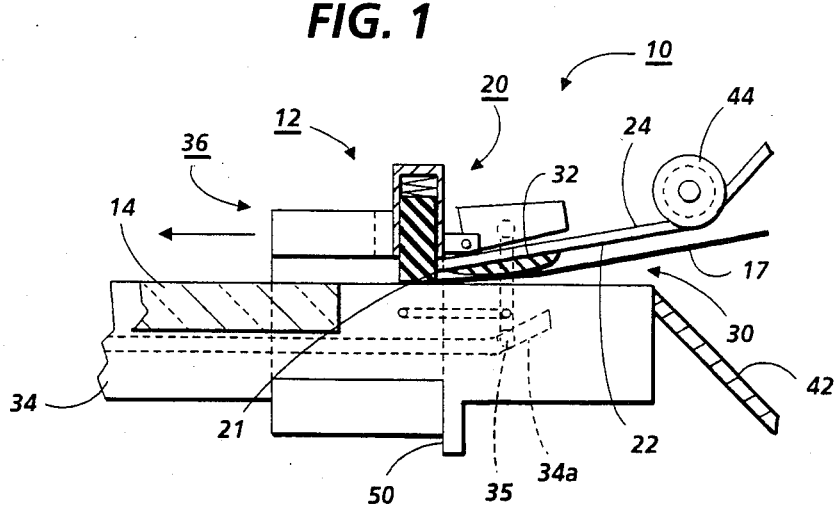

Various of the above-mentioned and further features and advantages will be apparent from the specific apparatus and its operation described in the examples below. The present invention will be better understood by reference to this description of this embodiment thereof. including the drawing figures (approximately to scale), wherein:

FIG. 1 is a front plan view of one example of a document handler in accordance with the present invention; and FIG. 2 is a partial enlarged view thereof of the document sheet input and preregistration area.

Describing now in further detail the specific example illustrated in the Figures, there is shown the relevant details of a new and improved document handling system 10, and in particular the novel document platen transport system 12 thereof, for sequentially transporting document sheets onto and over the platen 14 of a conventional fixed platen copier 16. Two operating positions thereof are also illustrated in FIG. 1 in dashed-line views. This platen transport system 12 is also adapted to automatically register each document sheet 17 at an appropriate registration position on the platen 14. Registration is provided by an integral registration system 20, including a preregistration gate 21 for engaging, stopping and deskewing, without damage, the lead edge of each document sheet 17 at an appropriate preregistration input loading position, as will be further discussed. Since the document handling system 10, or parts thereof, may be readily utilized with various conventional or appropriate copiers, the details of such copiers per se need not be described herein. There are no modifications required for the conventional copier platen 14.

The platen transport system 12 here includes a white backing or imaging surface 22 defined by the white lower surface of a platen cover 24 which is closely overlying the upper surface of the platen 14 during copying but normally retracted into a scroll 26. This "curtain shade" platen cover 24 is a thin flexible sheet made of Mylar TM, or other thin and flexible material suitable for this particular platen cover which is controlled to serve in lieu of a conventional rigid or semi-rigid platen cover to hold the documents to within the depth of focus of the copier optics and prevent show-around or show-through copy defects.

The operation of the disclosed document handling system 10 is extremely simple. Briefly, original sheets are inserted on the first or input side of the platen (here, the right side) with or without the aid of a separate sheet guide or tray. The platen cover 24 itself provides an input guide here. The lead edge of the entering document sheet is gripped by two frictional feed pads attached to the platen cover. The platen cover 24 unreels directly over the document, pulling the document across the platen. The document is reregistered at normal machine registration when it reaches the far left end of the platen. The "curtain shade" mechanism is locked in place there. The locking operation may be utilized to automatically trigger or initiate the normal "START PRINT" operation of the copier, to make the selected number of copies. After the preselected number of copies, i.e. the number of optical scans for the copier optics system under the platen, or the number of "flashes", this lock releases. This automatically exits the paper book to the same first side as the "curtain shade" mechanism is recoiled automatically by its spring loading. The locking or latching mechanism may be held by a magnet, spring, or connecting link or the like. Its release may be triggered electrically by a signal indicating the completion of the number of copies, e. g. the copier "READY" signal, or mechanically by a release arm or a control link.

The front or handle portion of the "curtain shade" forms a feeding and handle unit 36 which is controlled in its position and movement by slide tracks 34 along one or both sides of the platen. Preferably at the input area the feeder is ramped upwardly away from the platen so that the feeding mechanism is automatically opened for document loading, but so that as the feeding mechanism moves forward, it automatically ramps downwardly (due to the slide track ramp angle or otherwise) into engagement with the platen and therefore engages and grips the lead edge of the document. The slide track maintains this engagement between the feeder and the document across the platen and back.

The platen cover 24 here in its normal position is scrolled up near the first (input) side of the platen into the small diameter scroll 26. The scroll 26 is automatically wrapped around a roller reel mechanism 28 which defines the scroll 26 position. That position is slightly spaced above the level of the platen 14 by sufficient distance to allow both the insertion and ejection of document sheets through a sheet passageway 30 defined by this vertical spacing. The roller reel mechanism 28 includes an integral spring mechanism 29, which may be of a conventional type such as that utilized in window shades or the like, i.e., an internal spring or torsion bar or the like. The spring force is sufficient to fairly rapidly fully retract the platen cover into its scroll 26 configuration whenever the platen 24 is released.

The front edge of the platen cover 24 here has integrally attached thereto the document platen transport system 12, for frictionally feeding document sheets across the platen integrally therewith. As disclosed, the feeder here preferably comprises a small, centrally positioned, elastomeric pad 32. The pad 32 is adjacent to or part of the feeding and handle unit 36, and extends from the bottom surface 22 of the platen cover 24 toward the platen 14. In the normal or scroll position 26 of the feeding/handle unit 36, as shown in FIG. 2, the pad 32 is automatically cammed or otherwise lifted slightly above the platen surface, so as to allow the incoming document sheet to be fed under the pad 32. Then, as the front of the cover 24 begins to feed toward the opposite or downstream end of the platen, i.e. to the left as illustrated here, the elastomer pad 32 is automatically moved down to press down against the lead edge area of the document sheet so as to frictionally engage it centrally thereof and pull it across the platen 14. That is, there is no relative movement between the pad 32 or the platen cover 24 and the document sheet; rather the document sheet slides across the platen thereunder.

The movement of the feeding/handle unit 36 with the elastomeric pad and the consequent unscrolling of its attached platen cover 24 extends the latter out over the platen overlying the document sheet. This may be accomplished manually by pulling or pushing on the simple handle unit 36 attached adjacent the front edge of the platen cover 24, adjacent the pad 32 as shown. This feeding movement is controlled by the guide or slide tracks 34 extending along the opposite sides of the platen in the direction of movement of the platen cover and pad 32. As illustrated, these slide tracks 34, or an additional cam track 34 as shown, preferably are inclined upwardly at the normal or input end of the platen so as to guide or assist in the above-described upward movement of the pad 32 away from the platen at that point. Here, a parallelogram linkage is used to cam the pad 32 upwardly by a cam 35 riding up an upward sloping cam track 34a as the feeding/handle unit 36 approaches the stop 50, defining the preregistration and start of feeding position.

As noted above, a preregistration system 21 is preferably provided for preregistering the lead edge of the document sheet and deskewing it relative to the elastomeric pad 32. This may be provided by an integral gate extension under the platen cover 24 comprising an elongate transverse spring-loaded bar or plural spaced stop member which is held in contact with the platen (or the upper surface of the copier in the plane of the platen) in the normal or start position of the platen cover 24, as illustrated in FIG. 2. Thus, the lead edge of a document sheet 17 being inserted for feeding will abut and align with this preregistration system 21. Alternatively, a gate may be provided in the copier itself which is automatically raised in this same position. The side tracks 34 have an end stop 50 or other appropriate stops to provide an end or initial position for the preregistration system 21. That is, preventing the scrolling up of the end of the platen cover 24 with the pad 32 and handle 36 beyond the preregistration or loading position shown in FIG. 2.

It will be appreciated that alternative nonmanual means for feeding the document and platen cover across the platen may be provided. For example, a motor driven endless loop belt extending along one or both sides of the platen in the position in the slide tracks with a cam for engaging the front of the platen cover 24. As another alternative, a motor-driven double helix drive could be provided as illustrated in U.S. Pat. No. 3,775,008 issued Nov. 27, 1973 to R. A. Schaeffer et al (note FIGS. 2 and 6, inter alia) and in the Xerox "4000" copier platen lamp drive.

Irrespective of whether the platen cover 24 and the pad 32 are moved manually or automatically, a downstream stopping position is provided adjacent the downstream edge of the platen 14. In this stopping position the lead edge of the document is properly automatically registered at the proper copying position on the platen. Here, this stopping and copying (registration) position is provided by a latching system 38 which both stops and latches the end of the platen cover 24 at the downstream end of the platen. Preferably, as described above, this is a magnetic latch which can be either manually unlatched or is automatically unlatched at the completion of the desired number of copies by the then available signal from the copier. Alternatively, the latch may be of a mechanical type which is triggered by a release arm being struck by a control link under the platen from inside the copier, or other suitable unlatching means.

This latched position of the document handling system 10, during which copies are made, is illustrated in dashed lines at the left end of FIG. 1.

Copying occurs normally with the providing here of the covering of the entire platen by the white, opaque, light-reflective platen cover 24 holding the document down sufficiently closely adjacent to the upper surface of the platen 14 to maintain the focus and undistorted copying of the document sheet. No manual deskewing or registration alignment of the document sheet is required. This is automatically provided by the preregistration system 21, the latching stopping position, and the nonskewing feeding. If it is desired to use a conventional slightly raised downstream edge to stop and align the document lead edge, this may be provided by having the document lead edge strike that edge just before the latching stopping position. In that case, final registration is accomplished as the drag/feed pads slip relative to the document as the document is stopped by the platen registration edge.

Automatically upon the automatic release of the latching system 38, the document sheet 17 which has just been copied is automatically ejected from platen 14. It is so ejected from the same side of the platen from which it was originally fed in, which is a desirable system. The document sheets to be copied may thus be fed in from a paper guide or input tray 40 at the input side of the copier and automatically fed out into an output tray 42 positioned thereunder. Thus, both trays 40 and 42 are on the same side of the copier for compactness. In fact the input tray 40 and output tray 42 may be an integral unit which is a "hung on" attachment to one side of the copier, and readily removable as a unit therefrom. A document sheet ejection path from the platen under the document input tray 40 to the document output tray 42 is provided by mounting the document input tray 40 front edge slightly spaced above the level of the platen.

The automatic ejection of the document sheet in this manner is made possible by the fact that the platen cover 24 is continuously overlying and engaging the document sheet during this entire movement until the document sheet begins to emerge from the upstream end of the platen as it is ejected. Thus, even though the pad 32, in this direction of movement of the document, is at the downstream end of the document, i.e., is pushing on the end of the document and therefore violating the normal design principles of sheet feeding, it can do so here because the document sheet is prevented from buckling or wrinkling by the overlying platen cover 24. In this return or retraction movement, the platen cover 24 moves with the document until the document is ejected and then is scrolled up into its normal position on the scroll 26. Therefore it is automatically returned to its initial or loading position, and is immediately ready for receiving the next document sheet to be fed. Note that this entire automatic ejection operation is powered here solely by the integral spring system 29 in the roller reel 28 mechanism. No motor is required, yet this movement may be quite rapid. No manual operator handling of the document sheet or the handle unit 36 is required for either the release or the return movement or the ejection. The handle 36 would normally be released by the operator as soon as the latching system 38 is engaged. However this is not necessary and the system will still operate even if the operator forgets to release the handle 36 and moves it back manually.

Note that in their normal or retracted position, none of the above-described mechanisms of the document handling system 10 overly the platen or interferes in any way with manual document sheet or book copying. That is, manual placement of documents on the platen can be done in a normal manner. Furthermore, for the same reason, a conventional platen cover may be additionally provided, conventionally hinged on or along the rear edge of the platen and lowered for manual copying or raised upwardly and held upwardly (in the normal spring counter-balanced manner) away from the platen to allow the alternative operation of the document handling system 10.

The particular configuration of the elastomeric pad 32 is not critical. It may be plural transversely spaced pads or a single pad which is elongated transverse the direction of the document movement. However, preferably the pad 32 would not extend outside of the area of a smallest document sheet to normally be fed, so as to preferably not rub directly against the platen 14 during its movement. This is to reduce friction of the pad 32 movement and to also prevent contamination of areas of the pad which might extend beyond the edge of the document and therefore cause a "show-around" copy defect in the event of optical reduction copying of the document. Thus, the pad 32 will preferably not extend in dimensions across the entire platen, and in fact may be relatively small compared to the size of the document, so as to increase the normal-force contact area and therefore the frictional force between the pad and the document so as not to allow slippage therebetween. However, it should not allow document skew during feeding.

As noted, since the pad 32 lifts up automatically as it approaches its normal position adjacent the upstream end of the platen, this also automatically completely releases the document from the pad 32 at the end of the ejection (return) movement of the document. Thus the document is free to fall into the output tray 42 by its movement inertia and gravity, and to restack in said output tray automatically. However, the pad 32 is held down against the document in all other positions by the guide tracks and/or gravity.

Although not illustrated, it will be appreciated that a stack feeder separator may be provided at the input tray 40, if desired, for automatically separating and feeding individual sheets of documents from a stack thereof. This could be accomplished for example, by a different positioning of the upstream end of the slide tracks 34 and/or 34a for the pad 32 such that pad 32 would sweep down across and engage the top sheet of the stack of documents and feed it forward while the rest of the stack is conventionally contained by a front lip or other retard member.

It will also be appreciated that additional conventional guides or baffles may be provided to guide or assist the feeding in of the document sheet through the passageway 30 under the scroll 26. For the output, an exemplary exit guide baffle is illustrated to help urge sheets into restacking output catch tray 42.

An idler roller 44 is preferably provided as illustrated adjacent the upstream end of the platen to assist in guiding the platen cover 24 down into a position closely overlying the platen 14 as the platen cover unrolls. This also provides an incoming angled entry wedge of that portion of the platen cover 24 between this scroll 26 and this idler roller 44 which forms a controlled incoming guide or baffle for the passageway 30 for the document sheet being fed into the document handling system 10. The roller 44 here is a small diameter cylinder extending transversely across the platen, slightly above it, to smoothly engage and hold down flat the upper surface of the platen cover 24. With this system, the edges of the platen cover 24 themselves do not have to extend out to the side tracks 34. The side tracks 34 may preferably be engaged as illustrated here by transverse end extensions of a rigid bar member forming or including the handle 36, to which the front edge of the platen cover 24 is fastened. Thus, as the platen cover 24 extends, it is confined to a flat configuration closely spaced above the platen 14 by its mounting to the handle 36 at the front end of the platen cover, and by the idler roller 44 holding down the other end of the extended web portion of the platen cover 24 which is unscrolled from scroll 26.

These side tracks 34 may be simple rails, grooves, slots or any other suitable arrangement. They may for example be low cost plastic extrusions fastened in a "window frame" unit which mounts over the top of the copier with the "window" overlying the copier platen and the side frame providing the rails of the side tracks 34. The reel 28 and the input and output trays 40 and 42 may be an attachment to this same removable "window frame" unit.

Stationary static electricity eliminating brushes of a conventional design may be provided to engage the platen cover 24 and/or the incoming document sheet at the upstream end of the platen as they move relative thereto.

It may be readily seen that the present system very simply but effectively "automates", to a high degree, the otherwise repetitive and tedious *manual* placement, registration, alignment, and removal, of document sheets which is presently required on many small or inexpensive copiers. In fact with this system, document sheets can be fed in and ejected at a much more rapid rate than can be accomplished manually, enabling the operator to "keep up" with the copying rate per minute of many small copiers, so that the copier does not have to "cycle out" and wait for the next document as is often the case with manual document copying. The operator can prepare to load the next document in while the preceding is being fed in, copied and ejected.

The initiation of copying of the document sheet so fed and registered may be accomplished in the conventional manner by actuation of the normal copier "START PRINT" button. However, as an additional feature, there is preferably provided as an integral part of the latching system 38 a supplemental, electrically parallel, "START PRINT" switch 39. This switch 39 is automatically actuated by the handle unit 36 of the front edge of the platen cover 24 simultaneously with the latching engagement. Thereby copying is automatically initiated immediately as soon as the document and the platen cover are in their proper copying positions without requiring any manual switch activation by the operator.

In conclusion, the document handling system 10 may be constructed and operated at very low cost. It is very light in weight. It does not require any separate power source or motors. It is easily mounted over a conventional copier platen so that it can be lifted away from the platen for alternative manual document placement, registration and copying or complete removal. It can provide reliable feeding of documents in rapid sequence at the full copying rate of the copier. It allows multiple copies to be made of a selected document sheet without requiring the refeeding and reregistering of the document sheet to be recopied. It provides reliable and accurate registration with protection from document damage. It does not introduce "show-around" or "show-through" copy defects. It provides easy jam access and clearance. Thus, it is uniquely suitable for small, low cost, copiers, for which low cost document handling was heretofore not practicably available in many cases.

While the embodiment disclosed herein is preferred, it will be appreciated from this teaching that various alternatives, modifications, variations or improvements therein may be made by those skilled in the art, which are intended to be encompassed by the following claims:

What is claimed is:

1. An original document sheet handling apparatus for a copier for sequentially feeding document sheets on to and off of the copying platen of the copier, for making selected numbers of plural copies of document sheets, comprising:

document sheet input means adjacent a first side of said platen for inserting a document sheet into said document sheet handling apparatus, document sheet feeding means normally positioned adjacent said document sheet input means, said document sheet feeding means having frictional document engagement means for frictionally engaging a document sheet inserted in said document sheet input means, means for moving said document sheet feeding means over said platen to transport a document sheet over said platen therewith by continued engagement of the document sheet with said frictional document engagement means, flexible platen cover means integrally connected adjacent one end thereof to said document sheet feeding means for movement therewith, reel means, including retracting spring means, for compactly reeling up said flexible platen cover means into a scroll adjacent said first side of said platen and above said document sheet input means, so that a document sheet may be fed under said scroll from said document sheet input means by said document sheet feeding means, said flexible platen cover means being unreeled from said reel means to extend over said platen by said movement of said integral document sheet feeding means over said platen, said flexible platen cover means being adapted to overly said platen and provide an opaque and light reflective platen cover when so unreeled, releasable latching means mounted adjacent an opposite side of said platen from said first side of said platen and said document sheet input means, said releasable latching means being adapted to engage and latch said document sheet feeding means and said flexible platen cover means with said flexible platen cover means being latched overlying said platen and the document sheet overlying the platen in a copying position, and release means for automatically releasing and unlatching said releasable latching means in response to the completion of the selected number of copies of the document sheet being copied, said document sheet feeding means and said flexible platen cover means being automatically returned to said first side of said platen by being moved theretowards by said retracting spring means of said reel means upon said automatic releasing of said releasable latching means by said release means, for automatically returning the document sheet therewith to said first side of said platen while still being overlaid by said flexible platen cover means, and document sheet output means including means for ejecting the document sheet from said first side of said platen with said automatic return of said document sheet feeding means.

2. The document sheet handling apparatus of claim 1 wherein said document sheet input means comprises a document input tray, said document sheet output means comprises a document output tray, and said means for ejecting the document sheet from said platen with said automatic return of said document sheet feeding means comprises means for releasing the document sheet adjacent said document sheet output tray.

3. The document sheet handling apparatus of claim 1 wherein said means for moving said document sheet feeding means over said platen comprises guide track means adjacent said platen for controlling the movement path of said document sheet feeding means.

4. The document sheet handling apparatus of claim 1 said frictional document engagement means comprises an elastomeric pad, and wherein when said document sheet feeding means is moved away from said document sheet input means said elastomeric pad automatically engages the document sheet.

5. The document sheet handling apparatus of claim 1 wherein said means for moving said document sheet feeding means over said platen comprises guide track means adjacent said platen for controlling the movement path of said document sheet feeding means, and wherein said frictional document engagement means comprises an elastomeric pad, and wherein said document sheet feeding means is controlled by said guide track means to raise said elastomeric pad at a document input registration position at said document sheet input means to provide for both document engagement and initial document registration therewith, and wherein said document sheet feeding means is controlled by said guide track means to urge said elastomeric pad against said document towards said platen when said document sheet feeding means is being moved over said platen so as to transport a document sheet over said platen held between said elastomeric pad and said platen.

6. The document sheet handling apparatus of claim 1 further including preregistration means integral with said platen cover means and said document sheet feeding for means initially preregistering a document sheet at a preregistration position thereon.

7. The document sheet handling apparatus of claim 5 further including preregistration means, integral with said platen cover means and said document sheet feeding means, for initially preregistering a document sheet at a preregistration position thereon.

8. The document sheet handling apparatus of claim 6 wherein said frictional document engagement means comprises an elastomeric pad and wherein said preregistration means comprises an adjacent integral document gate member extending transversely of the platen, downstream of said elastomeric pad, to engage the lead edge of teh document sheet after the document sheet has been fed under said elastomeric pad.

9. The document sheet handling apparatus of claim 7 wherein said frictional document engagement means comprises an elastomeric pad and wherein said preregistration means comprises an adjacent integral document gate member extending transversely of the platen, downstream of said elastomeric pad to engage the lead edge of the document sheet after the document sheet has been fed under said elastomeric pad, and means for releasing the document sheet adjacent said document sheet output tray.

10. The document sheet handling apparatus of claim 1 wherein said copier has a conventional slightly raised registration edge adjacent said opposite side of said platen and said frictional document engagement means is adapted to drive a document sheet into engagement with said registration edge just before said engagement of said latching means and then slip relative to the document sheet to provide final registration of the document sheet.

* * * * *